United States Patent [19]

Kreider

[11] Patent Number: 4,776,719
[45] Date of Patent: Oct. 11, 1988

[54] TUBULAR STRUCTURAL SYSTEM

[76] Inventor: Jeff A. Kreider, 2436 Wineridge Dr., Birmingham, Ala. 35244

[21] Appl. No.: 118,764

[22] Filed: Nov. 9, 1987

[51] Int. Cl.⁴ .............................. F16D 1/00; B25G 3/00
[52] U.S. Cl. ........................................ 403/24; 403/347; 446/122
[58] Field of Search ................... 403/347, 24; 446/122

[56] References Cited

U.S. PATENT DOCUMENTS

| | | | |
|---|---|---|---|
| 2,625,769 | 1/1953 | Hubbard | 446/122 X |
| 3,071,399 | 1/1963 | Cronin | 403/219 |
| 3,469,339 | 9/1969 | Thomas | 446/122 |
| 4,169,573 | 10/1979 | Frieberg | 403/217 X |
| 4,294,561 | 10/1981 | Chapman | 403/219 |
| 4,406,562 | 9/1983 | Nasi | 403/347 |
| 4,469,377 | 9/1984 | O'Rourke | 297/DIG. 2 |

Primary Examiner—Andrew V. Kundrat
Attorney, Agent, or Firm—Jennings, Carter, Thompson & Veal

[57] ABSTRACT

A tubular structural system utilizes a plurality of graduated tubes, each having a plurality of apertures formed therein for receiving smaller tubes in a selectively locking configuration such that the tubes may be interlocked to form a structural framework.

12 Claims, 3 Drawing Sheets

TUBULAR STRUCTURAL SYSTEM

FIELD OF THE INVENTION

The present invention relates to the field of structural systems and more particularly to structural systems utilizing interconnecting tubular members which can be formed into toys, furniture, portable buildings, scaffolding, or playground equipment.

BACKGROUND OF THE INVENTION

Tubular members have long been known as structural elements in various applications. The manner in which such elements are joined has been the subject of the following patents of which I am aware:

The Cronin patent, U.S. Pat. No. 3,071,399, discloses a joint for tubular members wherein one or more tubular members are received in apertures of another tubular member with one of the received tubular members being an expandable sleeve internally mounted such that rotation of screw expands a portion of the received tubular member inside the receiving tubular member, thereby preventing withdrawal of the received members. This appears to be a permanent lock.

The Frieberg patent, U.S. Pat. No. 4,169,573, discloses a joint assembly in which a first tubular member receives a pair of orthogonal tubular members in apertures therein with a fastener connecting the orthogonal members internally of the first tubular member to prevent their withdrawal.

The Chapman et al patent, U.S. Pat. No. 4,294,561, discloses a joining member for receiving orthogonal tubular members therein and a means for securing the members by engaging only one of the members received within the joining member.

Nasi, U.S. Pat. No. 4,406,562, discloses an assembly node which is formed from a plurality of interlocking flat elements which are connected together as by welding.

Each of the above devices, except Nasi, requires the use of a fastener or is directed to a fastener. Nasi is directed to a node which is in essence a fastener for connecting elements in a spatial structure. None of the devices relies on the particular combination of apertures to achieve the interlocking connection as does the present invention nor does a combination of these devices suggest interlocking of tubular members.

SUMMARY OF THE INVENTION

It is the object of the present invention to provide a system of structural elements which can be readily connected to form a useful structure such as scaffolding and playground equipment, an article of furniture, support for a shelter, or toys.

The unusual flexibility and adaptability of my invention allows it to be used in almost any type structure with its utilization being limited only by the imagination of the builder. My invention utilizes a plurality of tubular structural members with each member having formed in each annular quadrant thereof a row of evenly spaced apertures with the apertures in opposing quadrants being aligned with each other and staggered relative to the apertures in adjacent quadrants such that each tubular member may be inserted through the apertures in a larger tubular member. The apertures in each row are spaced apart by a distance of about one half the diameter of the tubular member and the tubular members are sized such that each tubular member bears the same relationship to tubular members of various sizes with each size being about 0.707 times the diameter of the next larger size. An interlocking connection may thus be formed by joining a plurality of structural members together.

BRIEF DESCRIPTION OF THE DRAWINGS

Apparatus embodying features of my invention are depicted in the accompanying drawings which form a portion of this disclosure and wherein.

DESCRIPTION OF A PREFERRED EMBODIMENT

Figure 3:
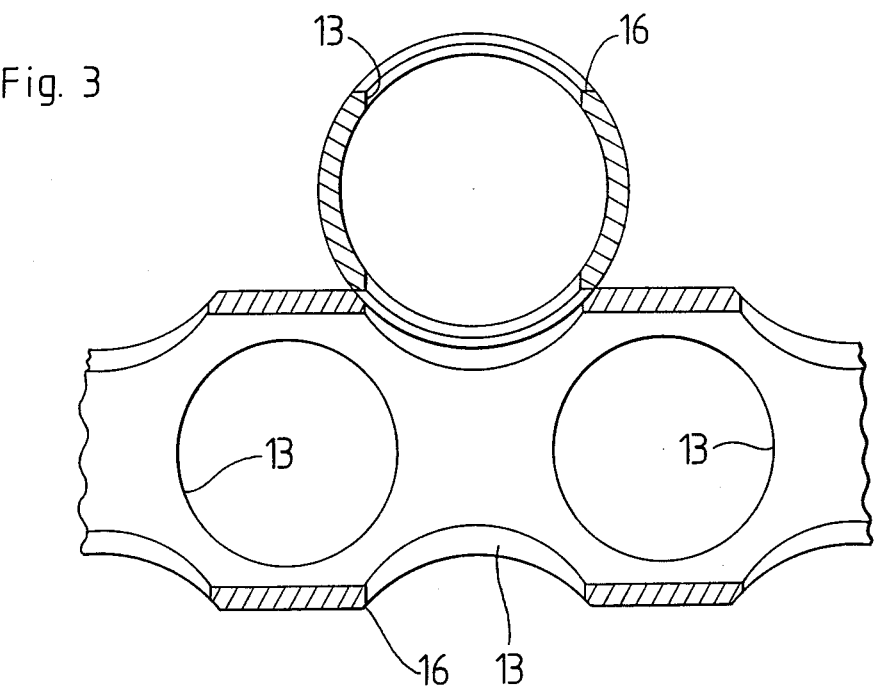
FIG. 3 is a sectional view of the intersection of a pair of perpendicular tubular members of the same size.
Figure 4:
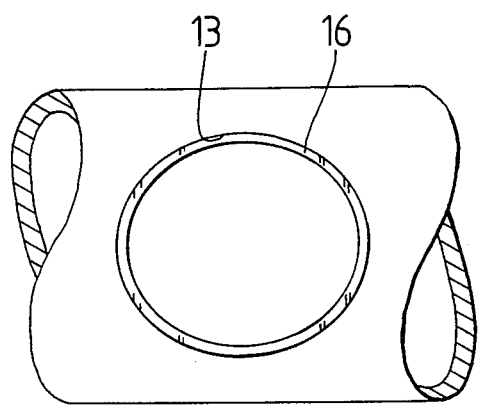
FIG. 4 is a partial plan view showing the apertures in detail.
Figure 5:
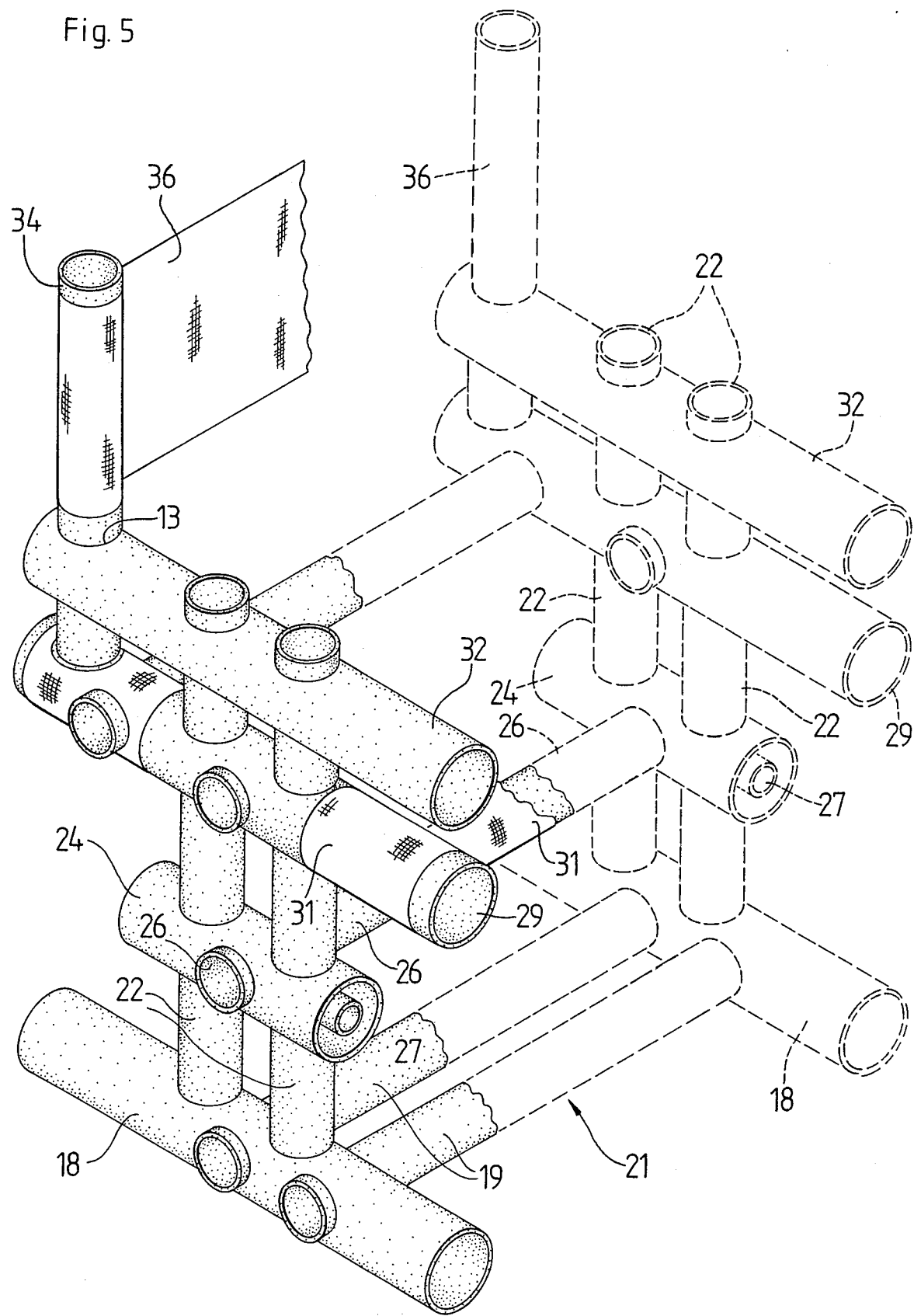
FIG. 5 is a perspective view of a structure made utilizing my invention.

Referring to the drawings for a clearer understanding of my invention, the general construction of the elements of my invention may be discerned from FIGS. 1–4 and the utility thereof may be most clearly seen in FIG. 5.

My invention utilizes tubular members as structural elements for any type structure amenable to fabrication in accordance with the the connections utilized as described herein. A primary tubular member 11 receives therethrough one or more secondary tubular members 12. As used herein primary and secondary refers to the relative size of interconnecting tubular members with "primary" designating the larger of the tubular members. In some instances, it will be desirable to have the primary and secondary tubular members of nearly the same size, however as may be seen hereinafter, the present system requires members of differing sizes to achieve its novel interlocking construction.

Each primary tubular member 11 is provided with a plurality of apertures 13 in the walls thereof through which the secondary tubular members 12 may be received. Thus each size tubular member is provided with a plurality of apertures through which smaller tubular members may be received. The size of the apertures 13 is limited by the structural integrity of the primary members 11, thus the apertures 13 should not have a diameter greater than about 0.707 of the diameter of the tubular member in which it is formed. As a consequence, each secondary tubular member 12 will have a maximum diameter of 0.707 of the primary tubular member 11.

Figure 1:
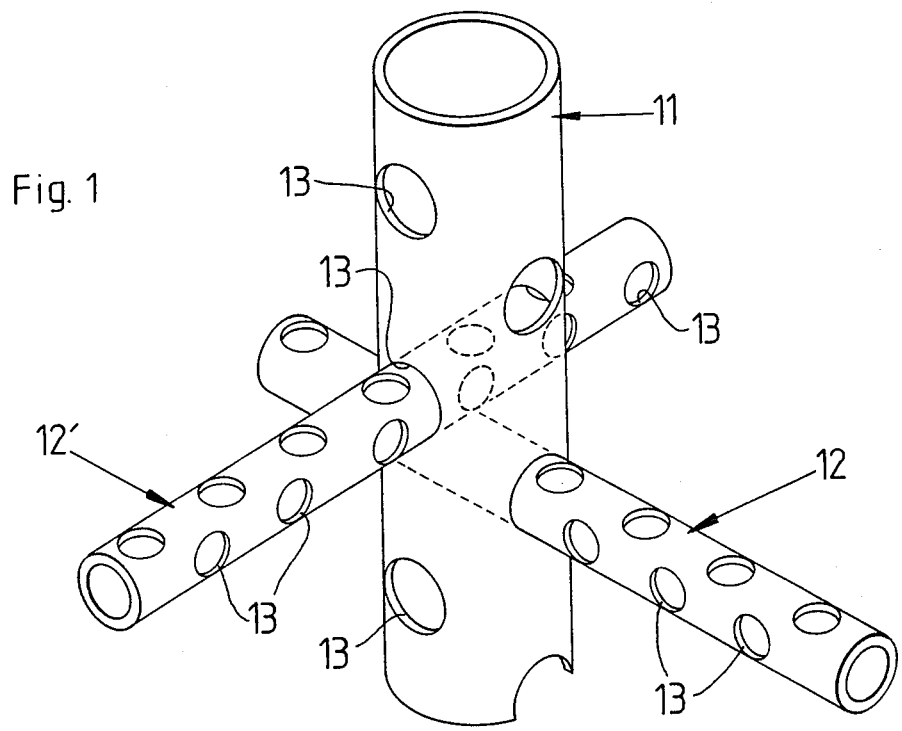
FIG. 1 is a perspective view of an orthogonal connection of three interlocking tubular members.
Figure 2:
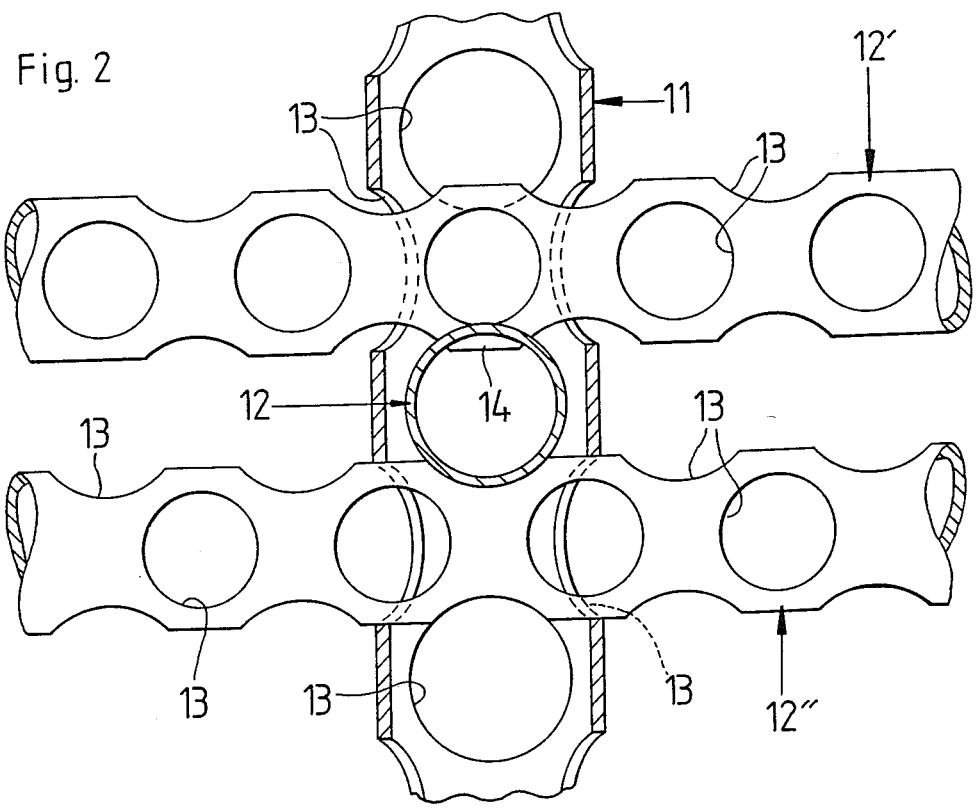
FIG. 2 is a sectional view of an orthogonal connection of four interlocking tubular members.

Referring to FIGS. 2 and 3 in particular, it may be seen that each tubular member has a row of apertures 13 formed in each annular quadrant. The apertures formed in opposing quadrants are aligned with each other such that a secondary tubular member may pass therethrough as shown in FIG. 2; however the apertures in adjacent quadrants are offset from each other. The separation between the apertures in a row in a quadrant is about 0.707 times the diameter of the secondary tubular member 12. Thus when two or more secondary members 12 are inserted in proximal sets of perpendicular apertures, the secondary member 12' orthogonal to the primary member and the first inserted secondary member can only be inserted if an aperture in the secondary member 12 is at the midpoint of the interior of the primary member 11 and only if the aperture is aligned with the bore of the primary member 11. Insertion of a second secondary member 12' such that an unapertured portion thereof is at the midpoint of the primary member 11 will lock the secondary member 12 in position. In FIG. 2, the center secondary member 12 has an aperture (not shown) oriented along the bore of primary member 11, thereby permitting insertion of the upper secondary member 12' and the lower secondary member 12". The upper secondary member 12' is inserted such that a portion 14 of the tubular member intermediate aperture 13 is positioned at the midpoint of the primary member 11, thus center secondary member 12 cannot be withdrawn. Lower secondary 12" is inserted such that its set of apertures thereof are aligned with the bore of the primary member 13, thus no locking action may occur. Of course upper secondary member 12' may be rotated about its axis thereby aligning its aperture with the bore of primary member 11 such that none of the secondary members are locked in place as is illustrated by FIG. 3. However, center secondary member 12 may be rotated 90° about its axis to then lock both upper and lower secondary members 12' and 12" in place.

The interconnection of the structural members in enhanced by the configuration of the apertures 13 as shown in FIGS. 3 and 4. The apertures 13 are eliptical in shape with the major axis extending longitudinally with the axis of the tubular member and the minor axis being transverse thereto. Thus the secondary members 12 are easily started into the apertures by virtue of the major axis but are soon firmly engaged laterally because the minor axis is slightly less than the diameter of the secondary tubular members. Also the apertures 13 have a beveled outer surface 16 proximal the exterior of the tubular member with the inner surface aligned substantially transverse to the longitudinal axis of the tubular member.

FIG. 5 represents a simple application of the present invention. A pair of lower primary tubular members 18 and a pair of lower secondary members are interlockingly connected to form a base 21. A pair of upright secondary members 22 form upright supports on each side of the base 21. A short length of primary tubular members 24 connects a secondary tubular member 26 to the upright secondary tubular member 22 as a brace. A short tertiary tubular member 27 coaxially mounted in primary member 24 secures this joint. Yet another pair of primary tubular members 29 form a horizontal support for a fabric platform 31 while additional primary members 32 form arm rests. Upright secondary members 34 at one end of the primary members 29 and 32 support a fabric back rest 36. Each of the joints are connected by proper alignment on the apertures 13 or by another member such as tertiary member 27 being inserted in locking relationship to the apertures.

In some instances it may be desirable to join the tubular members at other than right angles. This is easily accomplished by offsetting the apertures in opposing quadrants such that a secondary tubular member passing therethrough forms the desired angle relative to the primary tubular member.

While I have shown my invention in various forms, it will be obvious to those skilled in the art that it is not so limited but is susceptible of various changes and modifications without departing from the spirit thereof.

What I claim is:

1. A tubular structural system comprising a plurality of graduated tubular members characterised by a defined graduation into classes of different size tubular members with the diameter of the tubular members in each class having a defined ratio relative to the diameter of the tubular members in the class having the next larger diameter, with each tubular member having a plurality of aligned apertures therein for receiving therethrough tubular members of the next smaller class and a second plurality of aligned apertures therein for receiving therethrough a tubular member of the next smaller class at an angle of 90° to tubular members received through said first plurality of aligned apertures wherein adjacent apertures on the same side of said tubular member are separated by a distance of approximately one half of the diameter of the tubular members.

2. The structural system of claim 1 wherein the apertures in said first plurality of apertures are offset from the apertures of said second plurality of apertures longitudinally along said tubular member equidistantly intermediate adjacent apertures.

3. The structural system of claim 2 wherein each of said apertures is elliptical in shape with its major axis aligned longitudinally with said tubular member.

4. The structural system as defined in claim 3 wherein each aperture has the outermost portion thereof beveled.

5. A tubular structural system comprising a plurality of graduated tubular members characterized by a defined graduation into classes of different size tubular member with the diameter of the tubular members in each class having a defined ratio relative to the diameter of the tubular members in the class having the next larger diameter, with each tubular member having a plurality of aligned apertures therein for receiving therethrough tubular members of the next smaller class wherein adjacent apertures on the same side of said tubular member are separated by a distance of approximately one half of the diameter of the tubular members.

6. The structural system of claim 5 wherein each of said apertures is elliptical in shape with its major axis aligned longitudinally with said tubular member.

7. The structural system as defined in claim 5 wherein selected tubular members have paired apertures formed therein such that tubular members inserted therethrough are inclined relative to said selected tubular member at angles other than 90°.

8. The structural system as defined in claim 5 wherein tubular members of various sizes are inserted through the respective apertures in interlocking relationship whereby said tubular member function as structural members.

9. The structural system as defined in claim 8 wherein a plurality of tubular members of one class are aligned to form a base with a plurality of tubular members of the next smaller class inserted into said base forming tubular members in interlocking relationship; a predetermined number of tubular members of said next smaller class are inserted in locking engagement with said base forming tubular members to form upright supports; at least one tubular member is positioned to engage said upright supports to form braces therefor; a plurality of tubular members of the next larger or next smaller class engage said upright supports to form horizontal supports; and further comprising a platform forming member supported by said horizontal supports.

10. A tubular structural system comprising a plurality of graduated tubular members characterized by a defined graduation into classes of different size tubular members with the diameter of the tubular members in each class having a defined ratio relative to the diameter of the tubular members in the class having the next larger diameter, with each tubular member having a plurality of aligned apertures therein for receiving therethrough tubular members of the next smaller class wherein said apertures are aligned in opposing pairs formed on opposite sides of said tubular members with each pair of apertures spaced longitudinally intermediate a pair of apertures aligned perpendicular therewith with each pair of aligned apertures being separated longitudinally from adjacent apertures aligned parallel thereto by a distance of about one half the diameter of the tubular members.

11. A plurality of structural members for use in furniture and the like wherein the structural members are each tubular with each member having formed in each annular quadrant thereof a row of evenly spaced apertures separated longitudinally by a distance of approximately one-half of the diameter of the structural member with the apertures in opposing quadrants being aligned with each other and staggered relative to the apertures in adjacent quadrants such that each tubular member may be inserted through the apertures of a larger tubular member and may have inserted therethrough a smaller tubular member.

12. A tubular structural system comprising a plurality of graduated tubular members characterized by a defined graduation into classes of different size tubular member with the diameter of the tubular members in each class having a defined ratio relative to the diameter of the tubular members in the class having the next larger diameter, with each tubular member having a plurality of aligned apertures therein for receiving therethrough tubular members of the next smaller class and a second plurality of aligned apertures therein for receiving therethrough a tubular member of the next smaller class at an angle of 90° to tubular members received through said first plurality of aligned apertures wherein each aperture in said first plurality of apertures has an associated aperture aligned therewith on the opposite side of said tubular member and wherein adjacent apertures on the same said of said tubular member are separated by a distance of approximately one half the diameter of said tubular member

* * * * *